United States Patent
Sundberg et al.

[11] Patent Number: 5,960,392
[45] Date of Patent: Sep. 28, 1999

[54] METHOD AND ARRANGEMENT FOR ADAPTATION OF DATA MODELS

[75] Inventors: Erik Sundberg, Stockholm; Hakan Melin, Ekero, both of Sweden

[73] Assignee: Telia Research AB, Haninge, Sweden

[21] Appl. No.: 08/911,923

[22] Filed: Aug. 15, 1997

Related U.S. Application Data

[60] Provisional application No. 60/024,039, Aug. 15, 1996.

[51] Int. Cl.$^6$ ........................................... G10L 5/06
[52] U.S. Cl. .............................. 704/236; 704/231
[58] Field of Search ................................. 704/231, 232, 704/244, 256, 270, 250, 255, 236, 257

[56] References Cited

U.S. PATENT DOCUMENTS

| | | | |
|---|---|---|---|
| 5,778,341 | 7/1998 | Zeljkovic | 704/256 |
| 5,794,192 | 8/1998 | Zhao | 704/244 |
| 5,799,277 | 8/1998 | Takami | 704/256 |
| 5,806,029 | 9/1998 | Buhrke et al. | 704/244 |

*Primary Examiner*—Richemond Dorvil
*Attorney, Agent, or Firm*—Oblon, Spivak, McClelland, Maier & Neustadt, P.C.

[57] ABSTRACT

A method and an arrangement for adapting data models in adaptive speaker verification systems or similar adaptive systems using models based on data collected from a person, system or process during a certain time period. A plurality of different model units are used in the same speaker verification system. The verification system is put into operation using a simple model unit requiring a small amount of speech data. During the use, more speech data is collected continuously. This speech data is used to further train either (1) only more complex model units, or (2) both the simple model unit already in operation and the more complex model units. At suitable intervals, a comparison is made of the performance capacities of the model units. Once a more complex model unit yields a more reliable verification result, the more complex model unit is assigned to take over the verification in the operating situation. The more complex model unit may be put into operation either instantaneously or gradually, e.g. by using a weight function.

11 Claims, 4 Drawing Sheets

METHOD AND ARRANGEMENT FOR ADAPTATION OF DATA MODELS

CROSS-REFERENCE TO RELATED CO-PENDING APPLICATIONS

The present application claims priority to provisional application Ser. No. 60/024,039, filed Aug. 15, 1996, under 35 USC §119(e). The contents of the provisional application are incorporated herein by reference.

BACKGROUND OF THE INVENTION

1. Field of the Invention

The present invention relates to a method and an arrangement to adapt data models based on data collected during a certain time period. The collected data may be related to the physiology, behavior, aging, etc. of a person, process, or system, and the present invention particularly relates to adaptive systems such as adaptive speaker verification systems and the like.

2. Description of the Background

As is known, speaker verification systems are utilized in order to protect information or other economically valuable resources. Such systems are an alternative to the approach of using PIN codes in order to identify a user. The voice recording is either (1) made directly at the equipment where the verification is performed or (2) made remotely and transmitted by various media. Such media may be telephony or other telecommunication media.

Prior art speaker recognition systems use only one model to address the special problems captured by the data model. Thus, if a simple model is used, a less reliable verification has been obtained. On the other hand, if a more complex model is used, a long training period has been required. In systems of this type, collected data is compared to a model for the verification of the identity of the speaker or recognition of the speech in order to control a device or to control steps of a process. For the model to be able to perform its task, it has to be trained with speech data. Simpler models require less training but provide a less reliable result, while more complex models require longer training and provide a more reliable result.

SUMMARY OF THE INVENTION

It is an object of the present invention to overcome at least one disadvantage associated with prior art speaker verification systems.

The present invention advantageously utilizes a plurality of different models within the same speaker verification system. The verification system initially is put into operation with a first model which does not require much speech data. While in use, additional speech data is collected continuously. The additional speech data is used to further train either (1) only a second more complex model or (2) both the simpler, first model already in operation and the second, more complex model. Periodically, comparisons are made between the performances of the first and second models. When the second, more complex model provides a more reliable verification result, the verification system uses the second model instead of the first model.

The present invention provides a speaker verification system which can be put into operation quickly, albeit with lower reliability, but which eventually provides increased reliability. The invention uses the advantages of different models while, at the same time, minimizing the effects of their respective disadvantages. Without using this technology, one has to choose a model with its associated advantages and disadvantages at the start of a speaker verification system. By changing models, the system dynamically adapts to the available amount of speech data. This provides an advantage over the prior art.

Thus, the present invention provides a method for adapting a data model, e.g. speaker verification system comprising model units for receiving and evaluating speech. According to the invention, speech data is collected and a first model unit is put into operation while a second model unit is trained with speech data being collected during the operation of the first model unit. The performances of the model units are tested and evaluated and a subsequent model unit is put into operation when the performance thereof has reached a suitable level. Further, the second model unit may be put into operation either instantaneously or gradually, e.g. by using a weighting function. The invention may be applied in all speaker verification systems that are to be used on a plurality of occasions, that is, when speech of a single person is to be verified on repeated occasions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF A PREFERRED EMBODIMENT

Figure 1:
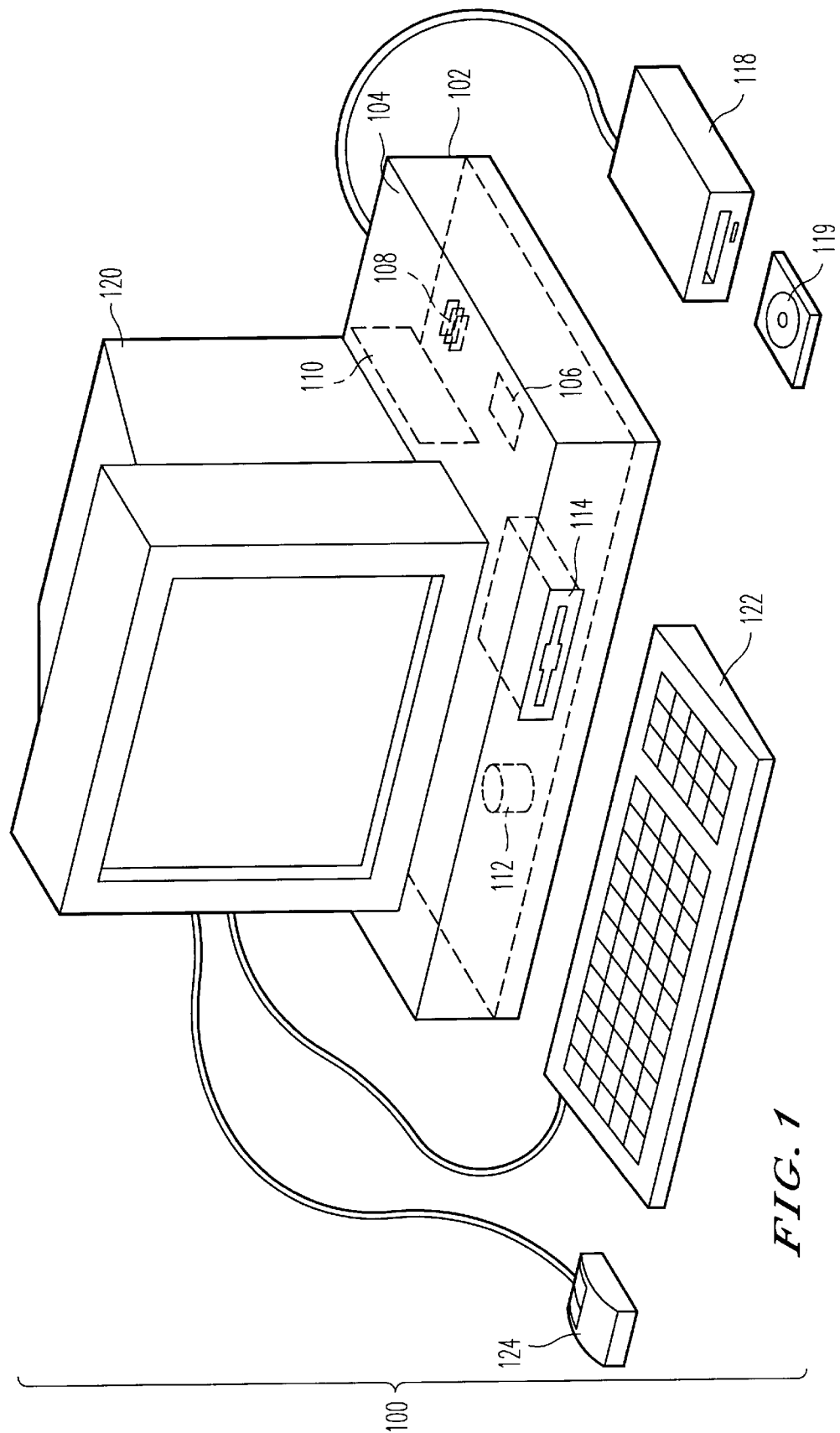
FIG. 1 is a schematic illustration of a computer system for implementing the present invention.
Figure 2:
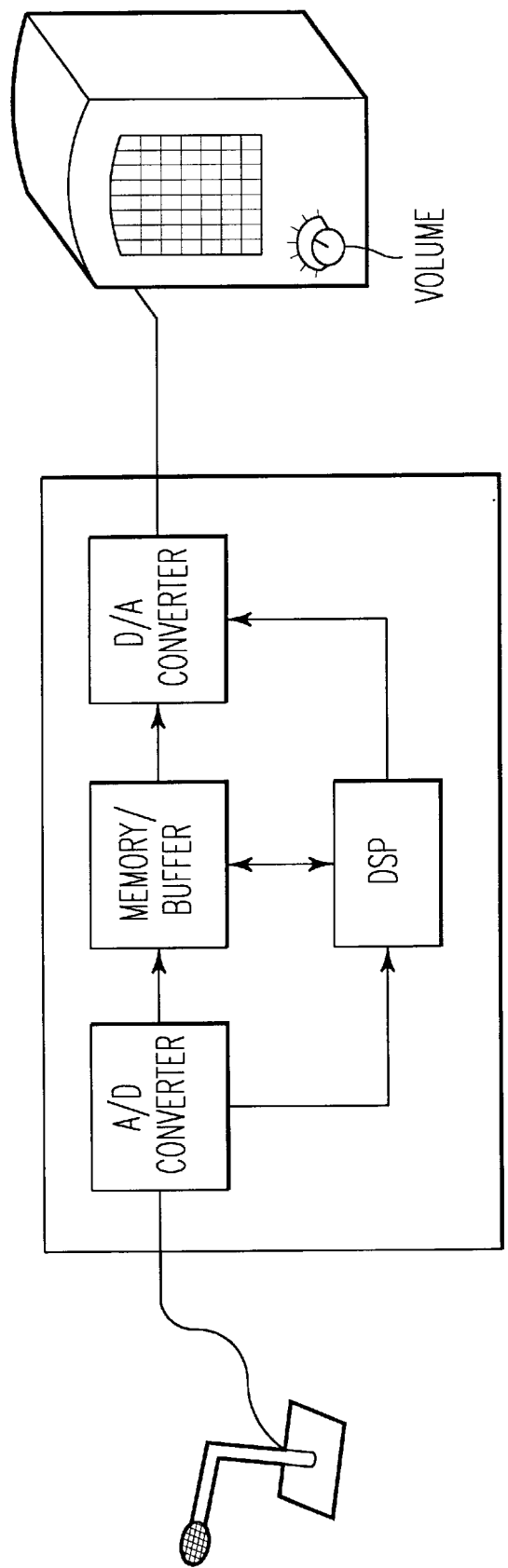
FIG. 2 is a schematic illustration of a speech input/output device connected to a speaker and a microphone.

Referring now to the drawings, wherein like reference numerals designate identical or corresponding parts throughout the several views, FIG. 1 is a schematic illustration of a computer system for adapting models based on data collected from a person periodically according to the present invention. A computer 100 implements the method of the present invention, wherein the computer housing 102 houses a motherboard 104 which contains a CPU 106 and memory 108. The computer 100 also includes plural user input devices, e.g., a keyboard 122 and mouse 124, and a display card 110 for controlling monitor 120. Likewise, the computer contains a sound card for both (1) sampling speech of a user, and (2) reproducing the sampled speech. In one embodiment, shown in FIG. 2, the sound card includes an analog-to-digital convertor for sampling speech from a user via a microphone. After having been converted into digital form, the speech signal is processed by either the CPU 106 or a digital signal processor to convert the digital speech signal from time domain data to frequency domain data. One of ordinary skill in the art would be able to perform such a conversion using Fast Fourier Transforms (FFTs). Digital data may also be converted to an analog waveform, using a digital-to-analog convertor, and the analog waveform is output to a speaker. Also, the digital data may be transferred across a digital communication medium before being converted to an analog waveform remotely. These techniques enable processed sound signals to be heard by a user of the system, either locally or remotely.

In addition, the computer system 100 of FIG. 1 further includes a floppy disk drive 114 and other removable media devices (e.g., compact disc 119, tape, and removable magneto-optical media (not shown)), a hard disk 112, or other fixed, high density media drives, connected using an appropriate device bus, e.g., a SCSI bus or an Enhanced IDE bus. Although compact disc 119 is shown in a CD caddy, the compact disc 119 can be inserted directly into CD-ROM players which do not require caddies. Also connected to the same device bus or another device bus, the computer 100 may additionally include a compact disc reader/writer 118 or a compact disc jukebox (not shown). In addition, a printer (not shown) also provides printed lists of different models and how and when data model units are selected.

The system further comprises at least one computer readable medium. Examples of computer readable media are compact discs, hard disks, floppy disks, tape, magneto-optical disks, PROMS (EPROMs, EEPROMs, Flash PROMs), DRAM, SRAM, etc. Stored on any one or on a combination of the computer readable media, the present invention includes software for controlling both the hardware of the computer 100 and for enabling the computer 100 to interact with a human user. Such software may include, but is not limited to, device drivers, operating systems and user applications, such as software development tools. Such computer readable media further includes the computer program product of the present invention for adapting and switching data model units.

Two types of verification systems are addressed by the present invention: (1) speech recognition systems which determine what is being said, but without determining by whom, and (2) speaker verification systems (i.e., voice recognition systems) which automatically verify the identity of a speaker. In speaker verification systems, the limiting factor is the amount of speech data that has to be collected from the user. When properly trained, complex speaker models requiring a large amount of collected speech data provide a better result than models requiring a small amount of training speech data. However, if a complex speaker model is trained with a small amount of training speech data, the complex model may yield an inferior result compared to the simpler model trained with an equivalent amount of training speech data. Often complexity also increases by using more parameters when processing the speech. Once the many parameters of a complex model have been estimated correctly, the complex model has a better verification performance than simpler models. However, correct estimation of the parameters requires a large amount of training data. When training data of a model is provided by a customer, the amount of training data is an inconvenience factor for the customer. Poor performance within a model will also lead to system errors, being another inconvenience factor for the customer.

By using a model system having a dynamic topology, the present invention addresses finding model topologies having good performance with a minimum of training data, thereby maximizing the performance of the model and minimizing the requirement of training data. The model system has a combination of data model units or parts having varying degrees of complexity. The effective topology of the model system is changed, such that for a given amount of training data the optimum topology is used, based on the given model unit. By using this technique, the effective complexity of the model will grow with the available amount of training data.

In the beginning of the service life of the model, the simplest model units are used, requiring only a small amount of data for a reliable estimation using its parameters. As the amount of available data grows, the system successively trains the more complex model units. Once the parameters of a more complex model unit have been estimated in a reliable way, the performance thereof is usually better than that of a simpler model unit, thus the topology or structure of the model may be changed in favor of the more complex model unit.

Figure 3:
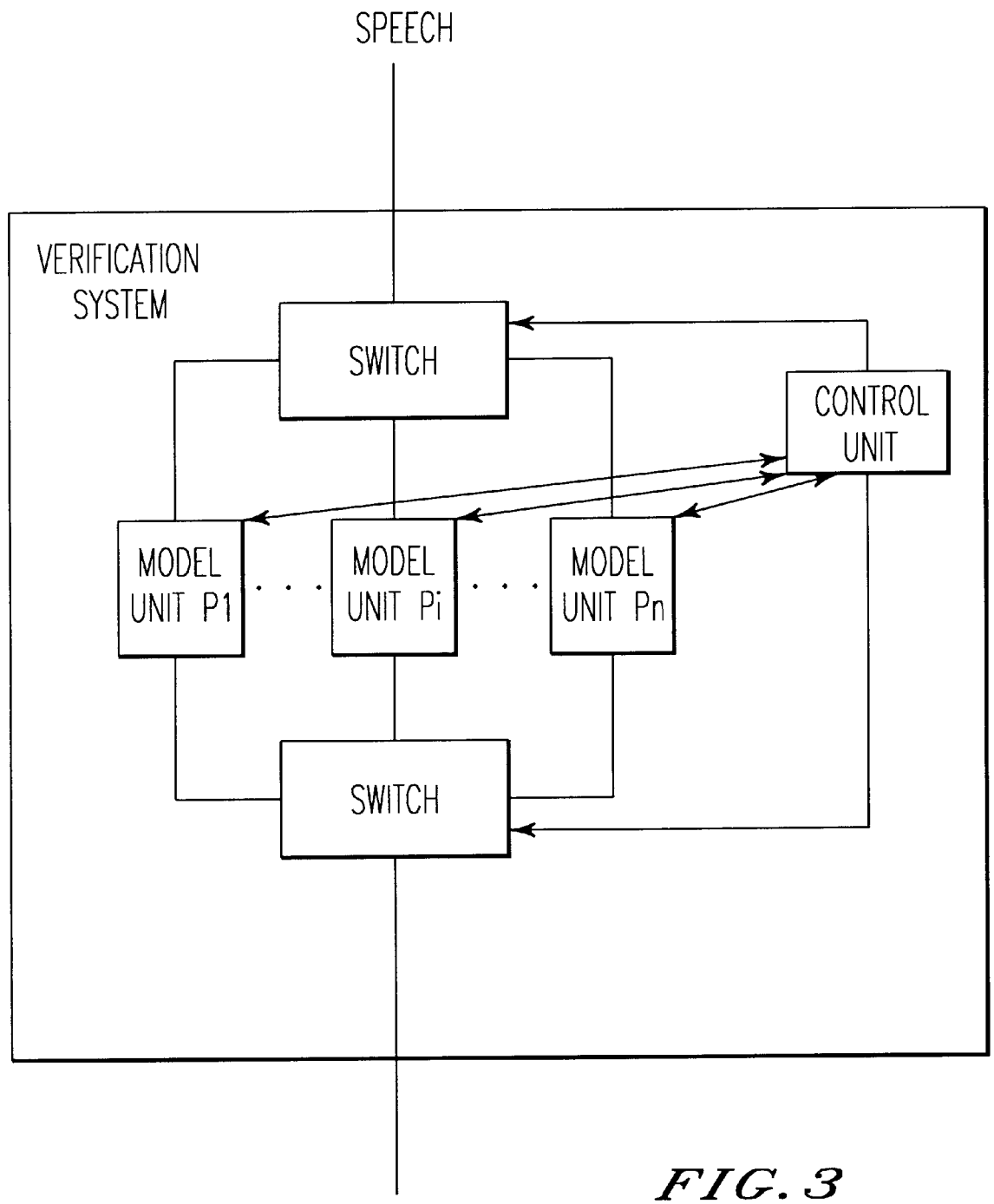
FIG. 3 is a block diagram of a system for switching and adapting data models.
Figure 4:
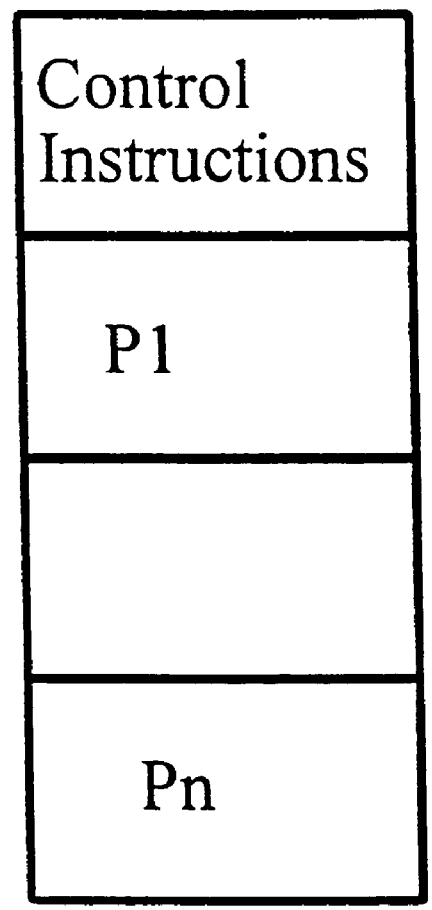
FIG. 4 is a block diagram of a computer readable medium configured with plural model units and control instructions for switching between the plural model units.

FIG. 3 is a block diagram of a speaker verification system in accordance with the present invention. The system includes a control unit controlling two switches and a number of model units, $P_1$ through $P_n$. The system receives speech or speech data and supplies verification data as the output signal.

The various model units ($P_1$ through $P_n$) of the speaker model are trained using different amounts of training data. A model unit $P_i$ should only be used for verification when it has received sufficient training data. The model units requiring a smaller amount of data will be put into operation earlier, while the more complex model units will not be used until a longer training period has elapsed. In this way, the performance of the speaker model may be enhanced towards its full capacity. During the growth period, the model may still be used for verification by using the simpler model units of the speaker model. Eventually, the simpler units are taken out of service as the more complex model units achieve better performance.

The shift to newer and more complex model units may be made over several generations, so that more and more advanced model units requiring more and more speech data are continuously put into operation. In fact, completely new model units can be added to an existing model in order to add new features to the system. In this way, a speaker verification system may be upgraded without being taken out of operation. In addition, in an alternate embodiment each model includes several sub-models weighted together in various ways to define a model. In yet another embodiment, one or more model units include sub-model units which may also be switched between based on training characteristics of the system, e.g., amount of training data, verification confidence, or presence or absence of a particular parameter in the input speech.

When the speaker verification system is put into operation initially, it requires a short training period to train the simplest model unit. The simplest model unit can be trained from a speaker independent template. Thereafter, the system changes operation modes by increasing complexity and performance in accordance with the invention as described above.

Each model unit of the speaker model hierarchy stores information relating to how well it is trained. This information is provided either by the model unit itself or by some performance testing method. In the former case, the information is called a training level while, in the latter case, the information is called a performance level. The training level is based on an assumed a priori knowledge about how much training data is needed by the model unit. The difference between the two kinds of information is that the performance level is based on some evaluation of test data (e.g., using a database run), while the training level is based on stored information about used training data. The performance level may be based on comparisons with other units of the speaker model and even other speaker models.

Thresholds for the training level and the performance level must be provided and stored in the control unit. In the former case, the threshold is based on previously made assumptions. For the latter, the value of the threshold is based on a criterion of the required recognition performance.

In order to enable use of a performance level based on a database simulation, it is necessary to include management of such a database. The speaker model should also be able to state a value of its total training level or performance level. This value may be used by an application to estimate the significance level of a decision taken by the verification system.

The performance of each of the model units is tested at suitable intervals in order to check which levels should be operating. This testing may be performed periodically or based on receiving a special command. In a computer controlled by a computer readable medium (e.g., a memory) programmed to implement the method and apparatus of the present invention, a user directs testing by issuing a command through a text or graphical user interface. The computer will then use the model unit(s) corresponding to the training and performance levels detected.

The invention has been described with reference to a speaker verification system but, as discussed above, the invention may equally be applied in other adaptive systems using data models based on data collected from a person, process or system, over a certain time period. The invention is only limited by the claims below.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A computer-implemented method for adapting a model in a speaker verification system which includes model units for receiving and evaluating speech, the method comprising the steps of
    a) receiving speech signals and converting the speech signals to speech data;
    b) putting a first model unit of plural model units into operation;
    c) training a subsequent model unit of the plural model units with speech data collected during operation of the first model unit;
    d) testing and evaluating a performance capacity of the subsequent model unit; and
    e) putting the subsequent model unit into operation once the performance capacity thereof has reached a suitable level.

2. The method according to claim 1, wherein the step e) of putting the subsequent model unit into operation comprises putting the subsequent model unit into operation instantaneously once the performance capacity thereof exceeds a predetermined threshold.

3. The method according to claim 1, wherein the step e) of putting the subsequent model unit into operation comprises putting the subsequent model unit into operation gradually, once the performance capacity thereof exceeds a respective threshold of a plurality of predetermined thresholds.

4. The method according to claim 1, further comprising the step b1) of connecting a new model unit as the subsequent model before the step c) of training.

5. The method according to claim 1, further comprising the step of training all of the plural model units with the collected speech data.

6. The method according to claim 1, further comprising the step of training all of the plural model units except operating model units with collected speech data.

7. A system for adapting a data model, the system comprising:
    plural model units for receiving and evaluating speech; and
    a control unit, including a first switch for directing speech data to the plural model units, a second switch for directing verification data from the plural model units, and a tester for testing performance capacities of the plural model units, the first switch being controlled by the control unit such that the plural model units collect speech data,
    wherein a first model unit of the plural model units initially is put into operation, a subsequent model unit of the plural model units is trained with speech data collected during an operation of the first model unit, and the tester tests and evaluates the subsequent model unit until the performance capacity thereof has reached a suitable level, after which the tester controls the second switch to direct the verification data from the subsequent model unit.

8. The system according to claim 7, wherein the control unit comprises a predetermined performance capacity threshold which must be reached in order to put the subsequent model unit into operation instantaneously.

9. The system according to claim 7, wherein the control unit comprises a plurality of predetermined performance capacity thresholds which must be reached in order to put the subsequent model unit into operation gradually.

10. The system according to claim 7, wherein at least one of said plural model units comprise sub-model units.

11. A computer program product, comprising:
    a computer storage medium and a computer program code mechanism embedded in the computer storage medium for causing a computer to adapt a data model, the computer program code mechanism comprising:
    a first computer code device configured to collect speech data;
    a second computer code device configured to put a first model unit of plural model units into operation;
    a third computer code device configured to train a subsequent model unit of the plural model units with speech data collected during operation of the first model unit;
    a fourth computer code device configured to test and evaluate a performance capacity of the subsequent model unit; and
    a fifth computer code device configured to put the subsequent model unit into operation once the performance capacity thereof has reached a suitable level.

* * * * *